United States Patent

[11] 3,622,440

| [72] | Inventors | Robert Howard Snedeker<br>Piscataway;<br>Kenneth Thomas Garty, Somerville; Frank Joseph Skiermont, Bound Brook, all of N.J. |
|---|---|---|
| [21] | Appl. No. | 835,933 |
| [22] | Filed | June 24, 1969 |
| [45] | Patented | Nov. 23, 1971 |
| [73] | Assignee | Union Carbide Corporation<br>New York, N.Y. |

[54] VITREOUS AND ORGANIC RESIN LAMINATES HAVING LOW-TEMPERATURE UTILITY
16 Claims, 5 Drawing Figs.

[52] U.S. Cl. .................................................. 161/193,
156/329, 156/334, 161/183, 161/203, 161/206,
161/247, 161/412
[51] Int. Cl. ........................................... B32b 17/10,
B32b 27/30
[50] Field of Search .................................... 260/87.3;
161/183, 193, 203, 204, 206, 247, 412; 156/329,
334, 272

[56] References Cited
UNITED STATES PATENTS

| 3,488,715 | 1/1970 | Atkins .......................... | 161/412 X |
| 3,520,768 | 7/1970 | Peilstocker et al. .......... | 161/183 X |
| 3,522,142 | 7/1970 | Wismer et al. ............... | 161/193 X |
| 3,532,590 | 10/1970 | Priddle ........................ | 161/183 |
| 3,484,333 | 12/1969 | Vanderbilt .................... | 161/193 X |
| 2,907,675 | 10/1959 | Gaylord ........................ | 117/47 |
| 2,940,869 | 6/1950 | Graham ........................ | 117/47 |
| 3,157,563 | 11/1964 | Baum ............................ | 156/334 X |
| 3,211,804 | 10/1965 | Baum ............................ | 260/848 |
| 3,234,197 | 2/1966 | Baum ............................ | 260/87.3 X |
| 3,350,362 | 10/1967 | Potts et al. .................... | 260/87.3 X |
| 3,388,032 | 6/1968 | Saunders ...................... | 161/183 |
| 3,359,154 | 12/1967 | Clark ............................. | 161/247 X |
| 3,398,210 | 8/1968 | Plueddemann et al. ...... | 161/203 X |
| 3,406,086 | 10/1968 | Foster .......................... | 161/183 |
| 3,408,420 | 10/1968 | Wiggill ......................... | 260/87.3 X |
| 3,450,686 | 6/1969 | Mortimer ..................... | 260/87.3 X |

*Primary Examiner*—Harold Ansher
*Attorneys*—Paul A. Rose, James J. O'Connell and Aldo J. Cozzi

ABSTRACT: Laminates are prepared with an adhesive which comprises ethylene-vinyl acetate copolymer, a source of free radicals and an organic compound source of silicon.

GLASS
ADHESIVE
POLYCARBONATE RESIN

PATENTED NOV 23 1971  3,622,440

INVENTORS
ROBERT H. SNEDEKER
KENNETH T. GARTY
FRANK J. SKIERMONT
BY James J. O'Connell
ATTORNEY

3,622,440

VITREOUS AND ORGANIC RESIN LAMINATES HAVING LOW-TEMPERATURE UTILITY

BACKGROUND OF THE INVENTION

1. Field of the Invention

The invention relates to the field of adhesively bonded laminate structures.

2. Description of the Prior Art

Structural elements in the form of laminates have been made with a number of different types of structural element materials using a variety of adhesives. The adhesives which have been used for such laminates include copolymers of ethylene such as ethylene-vinyl acetate copolymers. The use of this type of adhesive however has certain disadvantages in that:

a. its adhesion to substrates such as glass is relatively poor when the results are compared with those obtained with other commercially available adhesives such as plasticized polyvinyl butyral;

b. its light transmission, which is an important factor in glass and similar substrate based laminates, is low and the haze level is high, and c. its useful temperature range is limited, for example, at use temperatures of only slightly above 90° F. the toughness, modulus and strength of the adhesive is inadequate.

Summary of the Invention

Structural element laminates are prepared with an adhesive which comprises a copolymer of ethylene and vinyl acetate, a source of free radicals, and an organic compound source of silicon.

An object of the present invention is to provide a structural laminate with an adhesive based on an ethylene-vinyl acetate copolymer.

A further object of the present invention is to provide a structural laminate for low temperature use applications.

A further object of the invention is to provide a process whereby the various structural elements of laminate structures may be adhesively bonded together with an adhesive which comprises ethylene-vinyl acetate copolymer.

Description of the Preferred Embodiment

It has been found that laminates which have excellent physical properties over a wide temperature range, and particularly at low temperatures of the order of less than 0° C., and particularly about <0° to −40° C., are greatly resistant to delamination and which may be used as structural support members, may be readily formed by adhesively laminating the structural support members together with an adhesive system which may be either of the following systems which comprise, as the essential components thereof:

a. ethylene-vinyl acetate copolymer, chemical compound source of free radicals and organic compound source of silicon, b. ethylene-vinyl acetate copolymer and silyl peroxide, or, c. irradiated ethylene-vinyl acetate copolymer and organic compound source of silicon.

The Laminate Products

Figure 1:
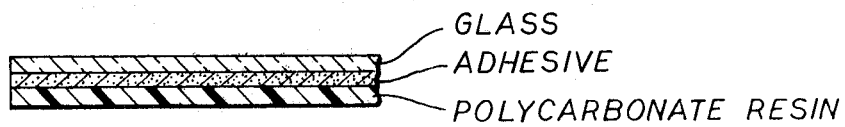
FIG. 1 is a side view of the laminate of the present invention which comprises one layer of adhesive.
Figure 2:
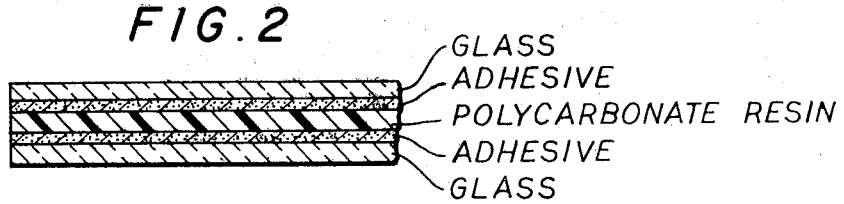
FIGS. 2 and 3 are side views of laminates of the present invention which comprises a plurality of structural member layers and a plurality of adhesive layers therebetween.

Laminate products of the present invention are illustrated in the drawings. In FIG. 1, for example, there is shown a laminate of one ply or lamina of glass and one ply or lamina of polycarbonate resin bonded together by an adhesive system of the present invention. In FIG. 2 there is shown another type of laminate of the present invention which consists of two laminae of glass bonded to a core lamina of polycarbonate resin by two laminae of an adhesive system of the present invention.

Figure 3:
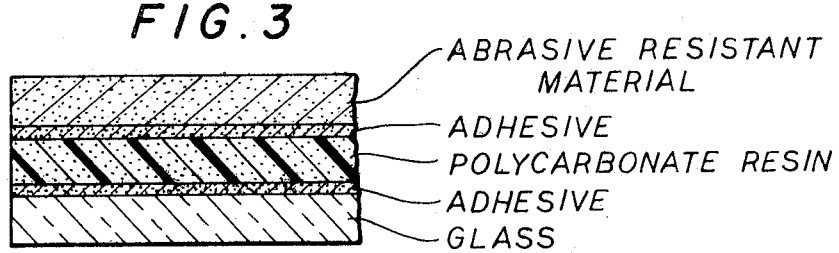

FIG. 3 shows a multiply laminate of the present invention which also contains an abrasion resistant lamina.

Figure 4A:
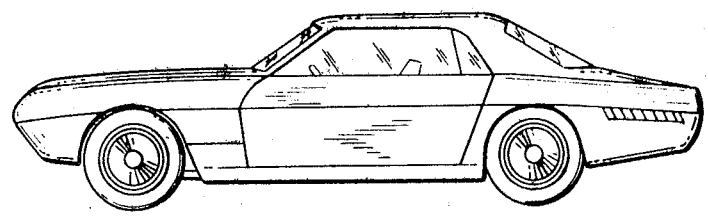
FIGS. 4a and 4b are side and front views of an automobile having, as a windshield, a laminate of the present invention.
Figure 4B:
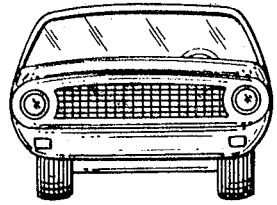

FIG. 4a shows a side view and FIG. 4b shows a front view of an automobile with a windshield made of a laminate of the present invention.

The Adhesive

The adhesive which is employed in preparing the laminates of the present invention is, as noted above, a system which may be either of the following systems which comprise, as the essential components thereof:

a. ethylene-vinyl acetate copolymer, chemical compound source of free radicals and organic compound source of silicon, b. ethylene-vinyl acetate copolymer and silyl peroxide, or, c. irradiated ethylene-vinyl acetate copolymer and organic compound source of silicon.

Each of the adhesive systems or compositions of the present invention contain at least 95 to 99.99999 weight percent of ethylene-vinyl acetate copolymer and about 0.00001 to 5 weight percent, based on the weight of such copolymer, of the other chemical compounds recited above as being essential components of such systems.

The preferred manner of employing the adhesive systems of the present invention is in the form of film or sheets of about 0.0005 to 0.50 inches in thickness. The adhesive system may be applied, however, to the laminae substrate surfaces which are to be bonded together in the form of a solution in an inert organic solvent. The solvent is then evaporated off and a coating of the desired thickness of the adhesive, i.e. 0.0005–0.50 inches is thereby formed on the surface of the substrate. Applicable solvents are those aliphatic and aromatic hydrocarbons, and their halogenated derivatives, in which polyethylene, generally, is soluble at elevated temperatures. Examples of such solvents would include aliphatic compounds such as hexane, heptane, octane and the like; cycloaliphatic compounds such as methylcyclohexane, cyclohexane, decalin and the like; aromatic compounds such as benzene, toluene, xylene, tetralin, styrene and the like; carbonyl containing compounds such as amyl acetate, ethyl acetate cyclohexane, and the like; halogenated hydrocarbons such as tetrachloropropane, trichlorocumene, tetrachloroethane, hexachlorobutadiene, 1,1,2-trichloroethane, 1,2-dichloroethane and the like; petroleum fractions such as petroleum ether, lubricating oil, solvent naptha and the like, turpentine, etc. To form a film or sheet of the copolymer, the copolymer is preferably dissolved in an inert organic solvent at temperatures near, or at, the boiling point of the solvent and the resulting solution is cast out on a suitable surface, such as a flat metal surface, and the solvent is then evaporated to yield a solvent-free film or sheet.

Such solutions can contain from about 5 weight percent or less to about 80 weight percent or more of the copolymer, and from about 95 weight percent or more to about 20 weight percent or less of solvent.

The adhesive may be applied as a film that is adhered to the substrate laminae by heat and pressure.

The adhesive may also be applied by melting it while it is in contact with the laminae, as by the use of heat and pressure, fluidized beds and the like.

Because the adhesion of the copolymer to substrates, such as glass, is a surface phenomenon, neither the thickness of the copolymer layer nor the thickness of the structural element laminae is of particular criticality. The thickness of the copolymer lamina is related to the temperature-use cycle for the application in question, with thicker films of the adhesive being required for the more stringent use conditions.

The adhesive should be applied so that it provides continuous contact with the laminae surfaces that are to be bonded.

If desired, various adjuvants such as tints, heat stabilizers, ultraviolet light stabilizers, ultraviolet light absorbers, fillers, and/or plasticizers can be incorporated in the ethylene-vinyl acetate copolymer without impairing its adhesion to the structural element laminae.

Where adjuvants are employed they must be materials which are physically and chemically compatible with each of the other components of the adhesive compositions under the described operating conditions. The adjuvants are used in amounts which will be effective for the intended purpose. Thus, for example, the effective amount of plasticizer is a plasticizing amount, that is, an amount of plasticizer that will appreciably increase the flexibility, processability, workability and/or distensibility of the copolymer based system. The stabilizers would be used in a stabilizingly effective quantity, and fillers would be used in effective quantities therefor, as for example, if a reinforcing filler is to be used, then the filler would be used in such amounts as to provide the desired reinforcing effect.

In addition to the solvent preparation technique disclosed above, the adhesive compositions of the present invention may be prepared by any of the commonly employed blending techniques employed for compounding components of polymeric compositions. Such procedures would include techniques such as dry blending or hot compounding, as well as with or without the use of mixing equipment such as ribbon blenders, muller blenders, intensive mixing blenders, extruders, Banbury mixers, and the like.

Ethylene-Vinyl Acetate Copolymer

The adhesive copolymer preferably contains about 15 to 95 weight percent, and most preferably 55 to 85 weight percent, of ethylene and preferably 85 to 5 weight percent, and most preferably 45 to 15 weight percent, of vinyl acetate.

In addition to ethylene and vinyl acetate, the copolymers which are used as adhesives in the present invention may also contain up to about 15 weight percent of one or more other monomers which may be copolymerized with ethylene and vinyl acetate.

Such other monomers would include other vinyl monomers, i.e., those which contain the group

, such as unsubstituted olefins including monoolefins such as propylene, isoprene, 1-butene, and isobutylene and polyolefins such as butadiene, 1,3-pentadiene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene m-methylstyrene, p-phenylstyrene, o-phenylstyrene, m-phenylstyrene, vinyl-napthalene and the like; vinyl and vinylidene halides such as vinyl chloride, vinyl fluoride, vinylidene chloride, vinylidene fluoride, vinylidene bromide and the like; vinyl esters such as vinyl formate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrollidine, ethyl methylene malonate, acrolein, vinyl alcohol, vinyl acetal, vinyl butyral and the like; as well as nonvinyl compounds such as carbon monoxide and formaldehyde.

The copolymers which are used as adhesives in the present invention should preferably be materials which are solid at room temperature. They will also have one or more of the following physical characteristics: softening points of about 55° to 205° C., an inherent viscosity of about 0.5 to 1.5 at 30° C. in toluene or a suitable solvent, and melt indices (ASTM D-1238-65T) of from about 0.1 dgm per minute to about 1000 dgm per minute or higher, with melt indices of from about 1 dgm per minute to about 350 dgm per minute preferred.

The copolymers can be prepared by any of the known processes provided they have the above described characteristics. One suitable manner of producing them is by the use of a catalytic amount of a free-radical catalyst employing batch, semicontinuous or continuous processes, using a stirred autoclave, a tubular reactor or the like. By the term "free-radical catalyst" is meant a catalyst which forms free radicals under the polymerization conditions employed, and includes oxygen and/or nitrogen radicals, peroxides such as hydrogen peroxide, dibenzoyl peroxide, diacetyl peroxide, ditertiarybutyl peroxide, dilauroyl peroxide, perbenzoic acid, peracetic acid, and the like; azo compounds such as azo-bisisobutyronitrile and the like.

In such process pressures of from about 5 p.s.i.g. (pounds per square inch gauge) to about 100,000 p.s.i.g. or more can be employed for the polymerization, with pressures of from about 15,000 p.s.i.g. to about 50,000 p.s.i.g. being preferred. The polymerization can be conducted at temperatures of from about 40° C. to about 400° C., with temperatures of from about 70° C. to about 225° C. being preferred.

The process may be carried out with or without diluents which may or may not be solvents for higher or both of the monomers, of for the resulting copolymers.

The ethylene and the vinyl acetate, and other monomers that are to be copolymerized, can be added separately, or as a mixture, to the pressure reactor provided they are in intimate contact with the free-radical catalyst at the polymerization conditions. After completion of the polymerization, the polymer is recovered by methods known in the art.

Chemical Compound Source of Free Radicals

The chemical compound sources of free radicals which are to be used in the adhesive systems of the present invention are chemical compounds, which may be organic or inorganic in nature. These compounds are preferably organic or inorganic peroxide compounds, that is, compounds containing the grouping –1–0–. In addition to, or in lieu of, the peroxide type compounds, other compounds which may be used as a source of free radicals would include azo compounds such as azo-bisisobutyronitrile, azo-dicyclohexylcarbonitrile, dimethyl-α, α-azo-diisobutyrate, and the like. These compounds may also be called free radical generators.

The preferred of these sources of free radicals are the peroxide compounds and the preferred peroxides are the organic peroxide compounds because (a) of their excellent compatibility with the ethylene-vinyl acetate copolymers; (b) they cause relatively little, if any, discoloration in the final products and leave no discernible residues; (c) they provide a broad range of free-radical forming temperatures; and (d) generally, they do not require the concurrent use of reducing agents to enhance the free radical forming mechanism.

The chemical compound sources of free radicals are employed in the adhesive systems of the present invention in amounts of 0.0001 to 5 grams per 100 grams of copolymer, when the free radical source is a silyl peroxide, and in amounts of 0.001 to 5 grams, per 100 grams of copolymer, when the chemical compound source of free radicals is a compound other than a silyl peroxide.

Organic peroxide compounds which may be used in the adhesive composition of the present invention as free radical sources would include alkyl peroxides e.g. t-butyl peroxide, alkyl esters of organic peracids e.g. t-butyl perbenzoate, and aryl substituted alkyl peroxides e.g. dicumyl peroxide. Specific compounds illustrative of these and other classes of organic peroxides are: cumene hydroperoxide, di-tert-butyl peroxide, di-methyl peroxide, tetralyl hydroperoxide, n-octyl hydroperoxide, diethyl peroxide, t-butyl hydroperoxide, t-butyl perbenzoate, t-butyl peracetate, peracetic acid, dibenzoyl peroxide, bis(p-chlorobenzoyl)peroxide, cyclohexanone peroxide, diacetyl peroxide, hydroxyheptyl peroxide, dibutyl peroxide, dipropionyl peroxide, dioctanoyl peroxide, dilauroyl peroxide, diisopropyl peroxydicarbonate, bis(heptafluorobutyryl) peroxide, bis(2,4-dichlorobenzoyl) peroxide, p-menthane hydroperoxide, pinane hydroperoxide, dicumyl peroxide, di-t-butyl diperphthalate, t-butyl peroxyisobutyrate, methyl ethyl ketone peroxide, 2,5-dimethylhexane-2,5-dihydroperoxide, and other organic peroxides such as are well known to those in the art.

In general, any compound may be used as a source of free radicals for the purposes of the present invention which is capable of generating free radicals when heated between about 70° C. and the decomposition point of the ethylene-vinyl acetate copolymer or of any of the components of the laminate being prepared.

The Silyl Peroxides

The embodiment of this invention which employs the silyl peroxides is a preferred embodiment because it allows this one material to function as both a chemical compound source of free radicals, as well as an organic compound source of silicon.

The silyl peroxide compounds would include those having the structure:

$$R''_n Si_x (O)_y (R')_z R'''_a$$

wherein R'' is a monovalent inorganic or organic radical, R' is a mono- or polyperoxy radical, such as ROO– and –OOR'OO–, where R is hydrogen or a monovalent organic radical bonded to the peroxy oxygen by a noncarbonyl carbon atom, such as alkyl, aralkyl, cycloalkyl, aryl, cycloalkyl and the like; R' is a divalent organic radical of a dihydroperoxide of such divalent organic radical; R''' is a nonperoxy containing divalent organic radical; n is 0 through 3 multiplied by x; x is 1 to a large number; y is 0 or equal to the equation

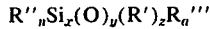

z is at least 1 and a is 0 or equal to the equation

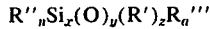

. Preferably, x is a number typically not greater than 25, preferably, it is a number not greater than 5, and most preferably, it is equal to 1.

Illustrative of R'' are any monovalent inorganic radicals such as hydrogen, hydroxyl, alkali metal oxide (such as NaO, KO, LiO), amino, and the like, and any organic radicals such as alkyl (e.g., methyl, ethyl, pentyl, dodecyl, octadecyl, 2-ethylhexyl, and the like), cycloalkyl (such as cyclobutyl, cyclohexyl, 4-methylcyclohexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenylethyl), alkenyl (such as vinyl, allyl, 3-butenyl, oleyl, and the like), alkadienyl (such as 1-butadienyl-1,4-, 1-octadecatrienyl-9, 11, 13, 1-neoprenyl, and the like), cycloalkenyl (such as 3-cyclohexenyl), haloalkyl (such as chloromethyl, gamma-chloropropyl, 3,3,3-trifluoropropyl, perfluoropropyl), haloaryl (such as 4-chlorophenyl 2,4-di-chlorophenyl chloronaphthyl), halocycloalkyl (such as 4-chlorocyclohexyl), alkoxy (such as methoxy, ethoxy, propoxy, dodecyloxy, isopropoxy, and the like), aryloxy (such as phenoxy, napthyloxy, biphenyloxy, and the like), alkylamino and arylamino (such as methylamino, diethylamino, phenylamino, and the like), and any organofunctional radical such as hydroxyalkoxy (such as beta-hydroxyethoxy, gamma-hydroxypropoxy, and the like); hydroxyalkoxyalkoxy (such as beta-hydroxyethoxyethoxy, omega-hydroxy(poly-ethyleneoxy)ethoxy, omega-hydroxy(poly-1,2-propyleneoxy), and the like); cyanoalkoxy (such as beta-cyanoethoxy, beta-cyanohexoxy and the like); cyanoalkoxyalkoxy (such as beta-cyanoethoxyethoxy, omega-cyanoethoxy(polyethyleneoxy), omega-cyanoethoxy(poly-1,2-propyleneoxy), and the like; carboxyalkoxy (such as beta-carboxyethoxy, and the like); haloalkoxy (such as chloromethoxy, bromoethoxy, perfluoropropoxy, and the like); cyanoalkyl (such as beta-cyanoethyl, gamma-cyanopropyl, and the like); cyanoaryl (such as 4-cyanophenyl); cyanocycloaklyl (such as 4-cyanocyclohexyl, 3-cyanocylopentyl, and the like); carboxyalkyl (such as beta-carboxyethyl, gamma-carboxypropyl, and the like); carboxyaryl (such as 4-carboxyphenyl); carboxycycloalkyl (such as 4-carboxycyclohexyl, 3-carboxycyclopentyl, and the like); isocyanatoalkyl (such as gamma-isocyanatropropyl, delta-isocyanatobutyl, and the like); isocyanatoaryl (such as 4-isocyanatophenyl); isocyanatocycloalkyl (such as 4-isocyanatocyclohexyl); alkyl or aryl carboxyalkyl (such as beta-methylcarboxyethyl, gamma-phenyl carboxypropyl, and the like); hydroxyalkyl (such as hydroxymethyl, gamma-hydroxypropyl, and the like); hydroxy(polyalkyleneoxy)alkyl (such as omega-hydroxy(polyethyleneoxy)propyl, and the like); alkenylcarbonyloxyalkyl (such as gamma-acryloxypropyl, gamma-methacryloxypropyl, and the like); epoxyalkyl (such as 1,2-epoxyethyl, 1,2-epoxypropyl, 1,2-epoxybutyl, and the like); epoxy alkyloxyalkyl (such as glycidyloxypropyl); epoxycycloalkyl (such as beta-3,4-epoxycyclohexylethyl); amino aryl and aminoalkyl (such as beta-aminoethylgamma-aminopropyl, aminomethyl, gamma-aminopropyl, delta-aminobutyl p-aminophenyl); and the like.

Illustrative of R''' is any divalent organic radical which is joined to silicon at each free valence, such as alkylene (such as methylene, ethylene, n-hexylene, 2-ethyl-n-hexylene, and the like); arylene (such as 1,4-phenylene, 1,3-phenylene, 1,5-naphthylene, and the like), cycloalkylene (such as 1,4-cyclohexylene, 1,3-cyclohexylene, 1,3cyclobutylene, and the like), and such divalent organic radicals as -(CH$_2$)$_3$COO(CH$_2$)$_3$, -(CH$_2$)$_3$CONH(CH$_2$)$_3$, -(CH$_2$)$_3$NHCONH(CH$_2$)$_3$, -(CH$_2$)$_3$O(CH$_2$)$_3$, -OCH$_2$CH$_2$O-, -O-(CH$_2$CH$_2$O)$_{10}$, and the like.

R' may be characterized as the residue of the hydroperoxides having the formulas ROOH analogously on and

HOOR'OOH obtained by the abstraction of hydrogen from the peroxy oxygen. Illustrative of such hydroperoxides are the following: hydrogen peroxide; methyl hydroperoxide; ethyl hydroperoxide; propyl hydroperoxide; isopropyl hydroperoxide; n-butyl hydroperoxide, sec-butyl hydroperoxide, t-butyl hydroperoxide; t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide; trans-decalin hydroperoxide (trans-decahydro-4-α-naphthyl hydroperoxide); hexahydro-3-α-indanyl hydroperoxide; 2,5-dihydroperoxy-2,5-dimethylhexane (2,5-dimethylhexylidene 2,5-hydroperoxide); 2,7-dihydroperoxy-2,7-dimethyloctane (2,7-dimethyloctylidene 2,7-hydroperoxide); 2-hydroperoxy-2,4-dimethyl-3-pentanone; 1,1,6,6,-tetrahydroperoxycyclodecane; 2-cyclopenten-1-yl hydroperoxide; 2-cyclohexen-1-yl hydroperoxide; 2-methyl-2-cyclohexen-1-yl hydroperoxide; 2,3-dimethyl-2-cyclohexen-1- yl hydroperoxide; d,1-3-p-menthenyl-8-hydroperoxide; 3-methyl-3-hydroperoxy-1-butyne(1,1-dimethyl-2-propynyl hydroperoxide); 2,5-dimethyl-2,5-dihydroperoxy-3-hexyne (1,1,4,4-tetramethyl-2-butynylenedihydroperoxide); α-methylbenzyl hydroperoxide; cumene hydroperoxide (α,α-dimethylbenzyl hydroperoxide); α-methyl-α-ethyl-benzyl hydroperoxide; α-p-xylyl hydroperoxide; diphenylmethyl hydroperoxide; triphenylmethyl hydroperoxide; tetralin hydroperoxide (1,2,3,4-tetrahydro-1-naphthyl hydroperoxide); 1,2,3,4-tetrahydro-1-methyl-1-naphthyl hydroperoxide; 9-fluorenyl hydroperoxide; 1-indanyl hydroperoxide; tetrahydro-2-furfuryl hydroperoxide; and tetrahydrocarbazole hydroperoxide (1,2,3,4-tetrahydro-4-α-H-isocarbazol-4-α-yl hydroperoxide) and 2,3-dimethyl-3-hydroperoxy butene-1.

As can be seen from the above description of the silyl peroxides, they may be in the form of a monomer or polymer, e.g., silane, siloxane, or silicane, in fact any silicon-containing compound which contains an organoperoxy group bonded to silicon, which organo moiety is bonded to the peroxy oxygen and thence to the silicon by a noncarbonyl carbon atom.

These silyl peroxides can be made pursuant to the processes described in copending U.S. applications: Ser. Nos. 737,315; 737,316; 737,317; 737,318; 737,319 and 737,321, all filed June 17, 1968 all, except Ser. No. 737,319, being now abandoned.

Specific example of such silyl peroxide compounds are vinyl tris(t-butylperoxy)silane allyl tris(t-butylperoxy)silane, tetratris(t-butylperoxy)silane, allyl(t-butylperoxy)tetrasiloxane, vinyl methyl bis(t-butylperoxy)silane, vinyl tris(α,α-dimethyl benzylperoxy)silane, allyl methyl bis(t-butylperoxy)silane, methyl tris(t-butylperoxy)silane, dimethyl bis(t-butylperoxy)silane, isocyanatopropyl tris(t-butylperoxy)silane and vinyl diacetoxy(t-butylperoxy)silane Irradiated Copolymer In one embodiment of the present invention the ethylenevinyl acetate copolymer may be irradiated with a source of ionizing radiation instead of using either the silyl peroxides or other chemical compound source of free radicals. In such case the copolymer is effectively irradiated, for the purposes of the present invention, by being subjected to a source of ionizing radiation in the amount of 0.5 to 10 megareps. Such sources include electron beam and gamma radiation sources.

Organic Compound Source of Silicon

The organic compound sources of silicon are organosilicon compounds which contain silicon bonded to carbon and at least one hydrolyzable group. They include the silyl peroxide compounds described above, as well as organosilicon compounds which are devoid of peroxide groups. The nonperoxidic organosilicon compounds may be used in combination with the silyl peroxides. Both the silyl peroxides and the nonperoxidic organosilicon compounds function as adhesion promoters.

The organosilicon compounds may be used as primers and applied to the surface of the laminae substrates in layers which are at least monomolecular in depth. These adhesion promoters may also be incorporated or admixed in the adhesive composition, In the latter case, the adhesion promoter is added to the adhesive in an amount corresponding to about 0.00001 to 5.0 percent by weight based on the weight of the copolymer content of the adhesive.

When the adhesion promoter is used as a primer or incorporated into the adhesive it may be used in the form of a solution in an organic solvent such as an alcohol, an ester, a ketone, an aromatic or aliphatic hydrocarbon, a halogenated hydrocarbon or mixtures of such solvents.

Examples of nonperoxidic organosilicon compounds which may be used as adhesion promoters include alkoxy silanes, aminoalkoxysilanes, vinylalkoxysilanes, epoxy alkyl alkoxy silanes, amino alkyl alkoxy silanes, cyano alkyl alkoxy silanes, hydroxy alkyl alkoxy silanes, and the like.

The amino alkyl alkoxy silanes would include those having the structure:

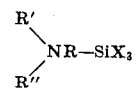

wherein X is alkoxy, aroxy or acyloxy; R is divalent alkylene of 3-8 carbon atoms with at least 3 sequential carbon atoms separating N from Si; at least one of R' and R'' is hydrogen, and any remaining R' and R'' is alkyl, $HO\{CH_2CH_2(O)_x\}$ 1–5 where $x$ is 0 or 1, $H_2NCO$-, $H_2NCH_2CH_2$- and $H_2NCH_2CH_2NHCH_2CH_2$.

Examples of such aminoalkyl-alkoxy silanes would include gammaaminopropyltriethoxy silane, gamma-aminopropyltrimethoxy silane, bis(beta-hydroxy methyl)gamma-aminopropyl triethoxy silane.

Other nonperoxidic organo-silicon compounds which may be used include gamma-methacryloxypropyltrimethoxy silane, beta (3,4-epoxycyclohexyl)ethyltrimethoxy silane, gamma-glycidoxy propyl trimethoxy silane, and vinyl triethoxy silane.

The Structural Element Laminae

The structural elements which may be used as laminae in preparing the laminates of the present invention include all those materials which are commonly employed in the preparation of laminates.

Laminates may be prepared having total thicknesses of the order of at least 0.05 to 2, or more, inches.

The laminae used to form a laminate, can be made of the same or different materials. The laminae may have a continuous or perforated surface; they may be porous or nonporous; they may have a woven or nonwoven construction; they may be in the form of leaf, film, foil, sheet, filament, bar, rod, and the like. They may be organic or inorganic in nature.

Organic materials would include
a. cellulosic materials such as wood, paper, cardboard, compressed sawdust, cotton, plywood, cane, bamboo, rattan, flax, hemp, jute, sisal, rayon, ramie, abaca, sansevieria, palma, fique, phormium, caroa, cantala (magney), coir, letona, esparto, mauritius, cabuya, sunn, kenaf, urena, nettle, and the like.
b. proteinaceous materials such as silk, casein, wool, leather, furs, pelts, hides, and the like.
c. thermoset or vulcanized materials based on natural and synthetic resins, such as, natural and synthetic polyisoprene rubber, polyacrylate rubber, polysulfide rubber, silicone rubber, polyurethane rubber, 1,3-butadiene-styrene copolymer rubbers, nitrile rubber (copolymers of dienes and unsaturated nitriles), butyl rubber (isobutylene-isoprene copolymers), neoprene rubber (chloroprene polymers), fluorocarbon rubber such as chlorotrifluoroethylene polymers, epoxy resins, alkyd resins, phenol-formaldehyde resins, melamine formaldehyde resins, urea-formaldehyde resins, olefin resins, such as cross-linkable polyethylene, polypropylene and ethylene-proplenediene terpolymers, polyester resins, and the like;
d. thermoplastic materials based on thermoplastic resins such as the so-called engineering plastics, such as polytetrafluoroethylene, the nylons, polyacetal resins, as well as other themoplastic resins such as the vinyl resins. These vinyl resins may be either homopolymers of an individual vinyl monomer or they may be interpolymers of one or more vinyl monomer and from 0 to about 50 mol percent of one or more nonvinyl monomers which are interpolymerizable with vinyl monomers. The term "vinyl monomer" means a compound which contains at least one polymerizable group of the formula $$-\overset{|}{C}=\overset{|}{C}-$$

The vinyl polymers would thus include, for example, polyethylene, polypropylene, ethylene-propylene copolymers, polyvinyl chloride, polyvinylidene chloride, polyvinyl fluoride, polystyrene, styrene butadiene-acrylonitrile terpolymers, ethylene-vinyl acetate copolymers, ethylene-acrylic acid copolymers, ethylene-acrylonitrile copolymers, styrene acrylonitrile copolymers and acrylate polymers.

In addition to the vinyl polymers, other thermoplastic polymeric materials which may be used in accordance with the present invention include thermoplastic polyurethane resins; polyamide resins, polysulfone resins; polycarbonate resins; phenoxy resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene/acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium aluminum, barium, zinc, zirconium, beryllium, iron, nickel, cobalt, and the like.

Inorganic materials would include:
a. minerals such as clay, coal, coke, peat, talc, vermiculite, graphite, bauxite, quartz, mica, asbestos, gypsum,
b. natural rock and stone materials such as linestome, marble, shale, slate,
c. building materials such as brick, plaster, tile, wallboard, cement, concrete,
d. elementary metals such as aluminum, chromium, cobalt, copper, gold, iridium, iron, lead, magnesium, nickel, platinum, silver, tin, titanium, tungsten, vanadium, zinc, zirconium and the like.
e. alloys of such (d) metals, such as alloy steel, alnico, brass, bronze, carbon steel, cast iron, chromium steel, nichrome, pewter, solder, stainless steel, sterling silver and the like.
f. compounds of such (d) metals, such as the oxides, of such metals.
g. vitreous materials such as glass, glassware, ceramics, enameled materials, china, porcelain, and the like.

The Lamination Process

In preparing the laminates in accordance with the present invention a layer of the ethylene-vinyl acetate copolymer based adhesive is applied between each pair of laminae which are to be bonded together and the resulting laminae, after being laid up one upon the other, are bonded together under elevated temperature and pressure conditions. The bonding is preferably conducted at a temperature of about 80 to 205° C., and most preferably at about 110 to 140° C., and at a pressure of about 2 to 300 pounds per square inch (p.s.i.), and most preferably at a pressure of about 150 to 250 p.s.i. The bonding is conducted below the decompositions temperatures of all the components of the laminates, other than the free radical generating compounds, when such compounds are employed.

The bonding operation may be conducted in any of the commonly employed pressurized devices which have been sued by those in the art for preparing structural element laminates such as autoclaves and hydraulic presses and rolls.

The surfaces of the laminae may also be chemically treated with various materials, in addition to the use of the organo-silicon compounds, in order to improve the adhesion of the laminae to each other. Treatments which may be made on the surface of the laminae in this regard include etching with appropriate chemicals such as acids, bases, oxidizing agents and reducing agents by painting, spraying, dipping or otherwise applying such compounds to the laminae surfaces.

The surfaces of the structural laminae may also be treated mechanically by sanding or other mechanical procedures such as embossing or striating or polishing.

The surface of the adhesive lamina may also be treated with chemicals such as reducing agents, oxidizing agents and/or organosilicon compounds; and/or mechanically embossed or striated to improve the adhesion properties thereof.

Where the laminate product is to have a nonplanar structure or configuration, the nonplanar configuration is preferably applied separately to the respective laminae before the laminae are laid up in the laminating equipment. The sizes of the laminates which may be prepared by the present invention are only limited by the size of the pressing or autoclave equipment which might be constructed to prepare such laminates. There are no apparent limitations on the thickness or size of the laminates as well as on the number of plies of laminae that may be employed in preparing such laminates.

APPLICATIONS

The laminates of the present invention may be used for applications which are subject to low temperatures, i.e. about 0° to −40° C. such as, where glass is used as one of the lamina, safety glass laminates, windshields and rear, top and side windows for automobiles, trucks, and other motor vehicles, trains, airplanes and motor boats; sliding glass doors or other glass doors; bank windows and shop windows; show cases; outdoor telephone booths; outdoor lighting lenses, globes, refractors and display signs; canopies, and other outdoor enclosures such as hothouses and vending machines. Other applications include laminates which contain electrical wires or thin layers of inorganic films for heating applications.

A series of examples of laminates were prepared to illustrate the present invention. These examples are merely illustrative of the present invention and are not intended as a limitation upon the scope thereof. In some of these examples the following polycarbonate resins were employed:

Polycarbonate resin A had a softening point of about 130° C. a reduced viscosity in chloroform at 25° C. of 1.00 and a melt flow of 4 dgm/minute and had the structure:

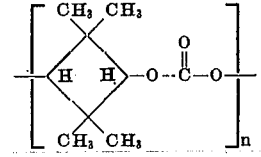

Polycarbonate resin B had a softening point of about 150° C., a reduced viscosity in chloroform at 25° C. of 0.74, and melt flow of 1.9 dgm/minute, and had the structure

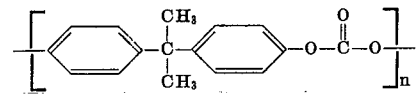

Polycarbonate resin C had a softening point of about 160° C., a reduced viscosity in chloroform at 25° C. of 0.80 and a melt flow of 4.8 dgm/minute and had a structure

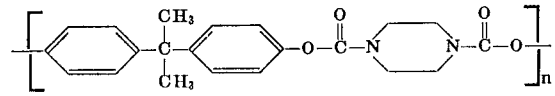

The term "reduced viscosity" values reported herein were computed by the use of the equation:

Reduced viscosity $= (t_s - t_o/ct_o)$ wherein $t_o$ is the efflux time of the solvent, $t_s$ is the efflux time of the solution of the polymer, and $c$ is the concentration of the polymer solution in terms of grams of resin per 100 grams of solvent.

The melt index flow values reported herein were measured as per ASTM test D-1238-65T.

EXAMPLE 1

Two 6 inch×6 inch×0.085 inch panes of plate glass were bonded to a 6 inch×6 inch×0.125 inch core of polycarbonate resin A by means of 0.020 inch sheets of an adhesive consisting of 1 percent vinyl tris(tertiary butyl peroxy) silane and 99 percent ethylene-vinyl acetate copolymer which contained 82 weight percent of ethylene and 18 weight percent of vinyl acetate. The ethylene copolymer had an inherent viscosity in toluene at 30° C. of 0.87 and a melt index of 2.5 dgm/min. (ASTM D-1238-65T). After the laminae of glass and polycarbonate were assembled with the sheets of adhesive therebetween, the assembly was bonded together in a press employing 200 lbs. per square inch of pressure at 130° C. for 30 minutes. This bonding step was followed by a cooling quench under pressure (200 p.s.i.) to reduce the temperature to about 23° C.

The resulting laminate, as shown in FIG. 2, was clear, that is, transparent, and all the laminae were bonded well at ambient temperatures. Impacting at 0° F. also revealed a high level of adhesion between the laminae with no glass delamination occurring. The vinyl tris(tertiary butyl peroxy)silane was incorporated via a two-roll mill into the ethylene-vinyl acetate copolymer prior to converting the copolymer into the sheets of adhesive which were used in the laminate process.

EXAMPLE 2

A laminate was prepared as in example 1 except that an ethylene-vinyl acetate copolymer which contained 67 weight percent of ethylene and 33 weight percent of vinyl acetate was used as the adhesive copolymer, and the first 20 minutes of the bonding cycle was accomplished at a lower pressure of 2 to 3 lbs. per sq. inch and the remaining 10 minutes at 25 p.s.i. The adhesion of the laminae in the resulting laminate was outstanding as in example 1. The copolymer used in the adhesive had an inherent viscosity of 0.78 in toluene at 30° C. and a melt index of 25 dgm/min. ASTM D-1238-65T).

EXAMPLE 3

A laminate was prepared as in example 1 with the exception that the surfaces of each of the glass plates were primed with eight drops of the silane prior to the lay-up of the laminae. Adhesion was comparably excellent as in example 1.

EXAMPLE 4

When a laminate is prepared as in example 1 with the exception that polycarbonate resin B is employed as the polycarbonate resin, adhesion is comparably excellent as in example 1.

EXAMPLE 5

A full size windshield (26 inches×62 inches) as shown in FIGS. 4a and 4b was made with tempered glass and polycarbonate resin A as in example 1 and in which the adhesive employed was the ethylene vinyl acetate copolymer of example 2. The copolymer had been uniformly admixed with 2.0 percent by weight of vinyl tris(t-butyl peroxy) silane. The thickness of the laminae were as in example 1. The autoclave conditions were a pressure of 200 p.s.i. at 135° C. for 30 minutes. The adhesion of the laminate was excellent.

EXAMPLE 6

A half windshield about (26 inches×31 inches) was produced, as in example 5, in which the adhesive employed was the ethylene-vinyl acetate copolymer of example 1. The copolymer was uniformly admixed with 0.001 percent by weight of carbon black. The carbon black was used in order to neucleate and thereby reduce crystallinity and haze of the adhesive copolymer. Prior to bonding the laminae together, the glass surfaces were primed with vinyl tris(t-butyl-peroxy)silane at the rate of about 0.65 drops/in$^2$. The autoclave conditions were a pressure of 200 p.s.i. at 275° F. for 60 minutes. The thickness of the laminae were as in example 5. Adhesion was excellent.

EXAMPLE 7

A laminate was prepared as in example 2 except that 2.0 percent by weight of vinyl triethoxy silane and 1.5 percent by weight of dilauryl peroxide was uniformly admixed into the adhesive. Bonding to glass was accomplished at a pressure of 3 p.s.i. for the first 3 minutes and at 100 p.s.i. for the next 25 minutes at 265° F. Adhesion of the laminae was excellent with no delamination observed at 180° F.

EXAMPLE 8

Example 2 was repeated except that polycarbonate resin C was used in place of polycarbonate resin A and the adhesive was compounded with 2 percent by weight of the silane adhesion promoter. The adhesion of the laminae was comparably outstanding.

EXAMPLE 9

Example 2 was repeated except that adhesive employed was copolymer which contained 60 weight percent ethylene and 40 weight percent vinyl acetate. This copolymer had an inherent viscosity of 0.70 in toluene at 30° C. and a melt index of 55 dgm/min. (ASTM D-1238-65T). Two percent by weight of the silane adhesion promoter was used. The bonding conditions were 10 minutes at 2-3 p.s.i. followed by 20 minutes at 25 p.s.i. and 257° F. Adhesion of the laminae was comparably outstanding.

EXAMPLE 10

An abrasion resistant laminate, as shown in FIG. 3, was prepared. The laminae employed measured 6 inches wide by 6 inches long. The glass lamina was 0.085 inches thick chemically tempered glass. The polycarbonate resin lamina was 0.090 inches thick polycarbonate resin A. The adhesive lamina was a 0.030 inches thick film of a copolymer of 60 weight percent ethylene and 40 weight percent of vinyl acetate which had a melt index of 25 dgm/min. The adhesive contained 3 percent by weight of vinyl tris(t-butyl peroxy)silane which had been milled into the copolymer at 75° C. The abrasion resistant lamina was a 0.006 inches thick sheet of polymethylmethacrylate which had a reduced viscosity of about 0.70.

The laminate was prepared by assembling the laminae, as shown in FIG. 3, in an hydraulic press and subjecting the assembly to a pressure of 100 p.s.i. at 130° C. for 30 minutes. The adhesion of the laminae in the resulting laminate was excellent.

EXAMPLE 11

A laminate was prepared as in example 10 using a 0.005 inches thick film of a tetrafluoroethylene-hexafluoropropylene copolymer, which had a specific gravity of 2.15, as the abrasion resistant lamina. Adhesion of the laminae was excellent.

EXAMPLE 12

A laminate was prepared as in example 11 using, as the adhesive, a 0.020 inch film of a copolymer of 67 weight percent of ethylene and 33 weight percent of vinyl acetate which had a melt index of 25 dgm./minute and which contained 3 percent by weight of the silyl peroxide, and, as the abrasion resistant lamina, a 0.002 inch thick film of polyethylene terephthalate. The adhesion of the laminae was excellent.

EXAMPLE 13

A laminate was prepared as in example 11 except that the silyl peroxide was used as a primer. The surfaces of the polycarbonate resin lamina and the abrasion resistant material lamina which were to be bonded were primed with neat liquid silyl peroxide brushed out to give a thin film. The adhesive was a 0.020 inch thick film of the adhesive of example 12. The adhesive was used between all the laminae. The adhesion of the laminae was excellent.

EXAMPLE 14

An adhesive composition was prepared by blending the copolymer of example 2 with 2 weight percent vinyl tris(tertiarybutyl peroxy)silane as in example 1. The adhesive mixture was then extruded in the form of a film, at 110° C. This film was then irradiated in a van der Graf electron accelerator which had an output of 500 watts of electron beam power. The film was exposed to an electron beam current of 2 megareps and then assembled between a layer of plate glass and a layer of polycarbonate resin. The resulting laminate was then heated at 130° C. for 1 hour under a pressure of 150 p.s.i. Adhesion of the laminate was excellent. The resulting laminate is shown in FIG. 1.

The products made in all the examples have good impacting properties at low temperatures of $<0°$ to $-40°$ C. For example, when impacting of the laminate is effected with a 5-pound steel ball dropped onto the glass lamina side of the laminate from a height of 6 feet, the glass shatters but remains substantially bonded to the polycarbonate resin laminae.

The melt flow test as referred to herein with respect to the present invention differs from the standard melt index test in that the melt flow tests were run at 285° C. and the melt index tests are run at 190° C. as per ASTM D-1238-65T. The melt flow test was used for evaluating the polycarbonate resins and the melt index test was used for evaluating the adhesive copolymer.

What is claimed is:

1. A laminate having low temperature utility and comprising adhesively bonded laminae wherein the laminae are selected from the group consisting of vitreous and organic resin laminae and the adhesive is selected from the group of compositions which comprise, as the essential components thereof, a. nonirradiated ethylene-vinyl acetate copolymer, chemical compound free radical generator, and nonperoxidic organosilicon compound, b. nonirradiated ethylene-vinyl acetate copolymer and silyl peroxide, and c. irradiated ethylene-vinyl acetate copolymer and nonperoxidic organosilicon compound.

2. A laminate as in claim 1 in which the adhesive is composition a.

3. A laminate as in claim 2 in which said organo-silicon compound is a vinyl trialkoxysilane.

4. A laminate as in claim 2 in which said organo-silicon compound is vinyl triethoxysilane.

5. A laminate as in claim 1 in which the adhesive is composition b.

6. A laminate as in claim 5 in which said silyl peroxide has the structure $R''_n Si_x(O)_y(R')_2 R'''_a$ where:

$R''$ is a monovalent inorganic or organic radical,
   $R'$ is a mono- or polyperoxy radical,
   $R'''$ is a nonperoxy containing divalent organic radical,
   $n$ is 0 through 3 multiplied by $x$,
   $x$ is 1 to $\leq 25$,
   $y$ is 0 or equal to the equation $$\frac{x(4-n-z-a)}{2}$$

$z$ is at least 1, and
   $a$ is 0 or equal to the equation $$\frac{x(4-n-z-a)}{2}$$

7. A laminate as in claim 6 in which $x$ is 1 to 5.

8. A laminate as in claim 6 in which said silyl peroxide is vinyl tris(tertiary butyl peroxy) silane.

9. A laminate as in claim 6 which comprises at least one lamina of synthetic resin.

10. A laminate as in claim 6 which comprises at least one lamina of vitreous material.

11. A laminate as in claim 10 which further comprises at least one lamina of synthetic resin.

12. A laminate as in claim 10 in which said vitreous material is glass.

13. A laminate as in claim 12 which further comprises at least one lamina of synthetic resin.

14. A laminate as in claim 1 in which the adhesive is composition c.

15. A laminate as in claim 14 in which said organo-silicon compound is a vinyl trialkoxysilane.

. A laminate as in claim 15 in which said organo-silicon compound is vinyl triethoxysilane.

* * * * *

UNITED STATES PATENT OFFICE
CERTIFICATE OF CORRECTION

Patent No. 3,622,440          Dated November 23, 1971

Inventor(s) Robert H. Snedeker et al.

It is certified that error appears in the above-identified patent and that said Letters Patent are hereby corrected as shown below:

Column 4, line 41, "higher" should read --either--; line 42, "of" should read --or--; line 56, "-1-0-" should read -- -0-0---. Column 6, line 55, "analogously on" should be cancelled. Column 8, line 59, "proplenediene" should read --propylene-diene--. Column 9, line 74, "sued" should read --used--. Column 14, line 11, "2" should read --3--; line 16, that portion of the formula reading $(R')_2$ should read $(R')_z$; line 51, --16-- should be inserted before "A laminate".

Signed and sealed this 16th day of May 1972.

(SEAL)
Attest:

EDWARD M. FLETCHER, JR.
Attesting Officer

ROBERT GOTTSCHALK
Commissioner of Patents